Figure 1:
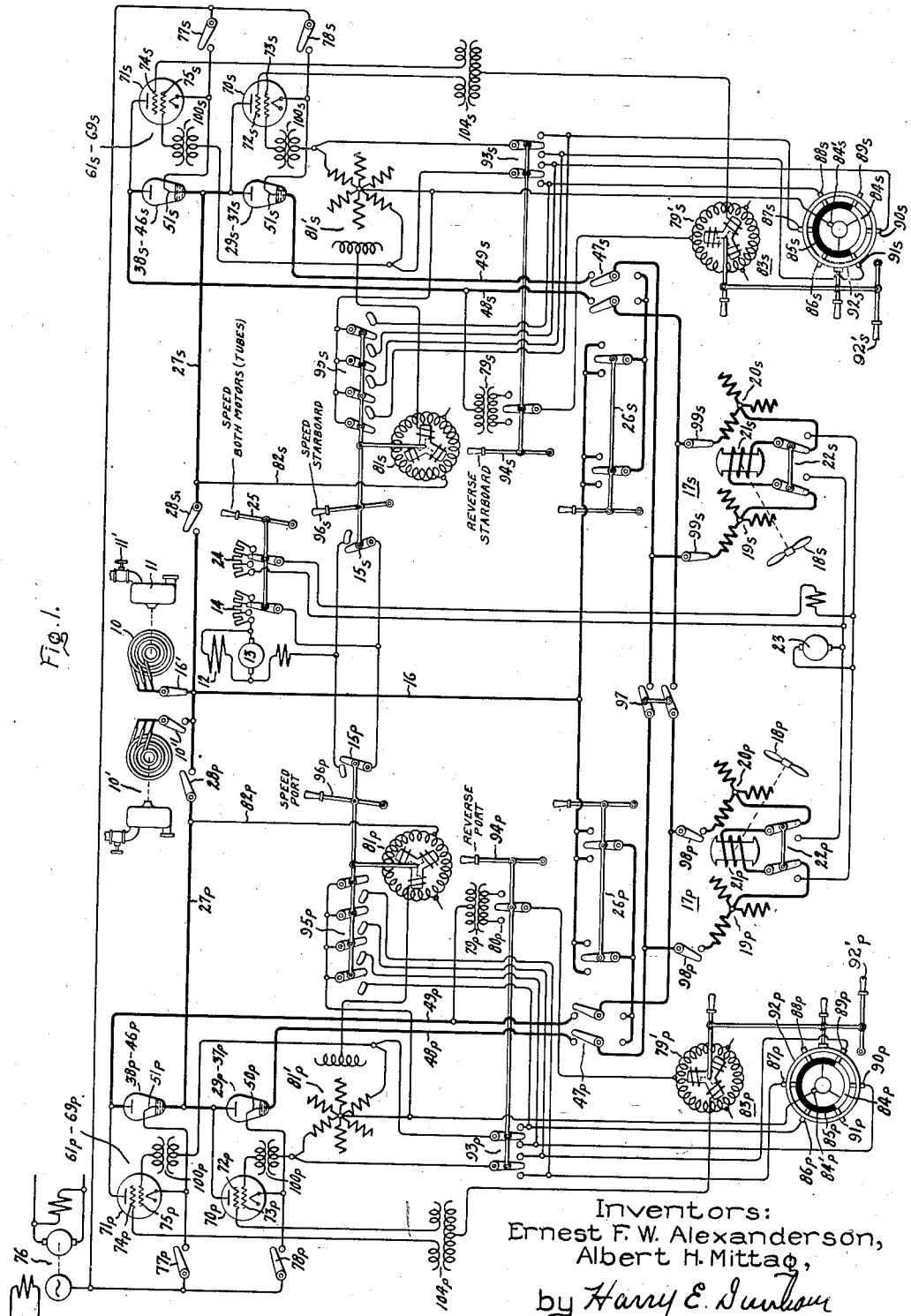

Inventors:
Ernest F. W. Alexanderson,
Albert H. Mittag,
by Harry E. Dunham
Their Attorney.

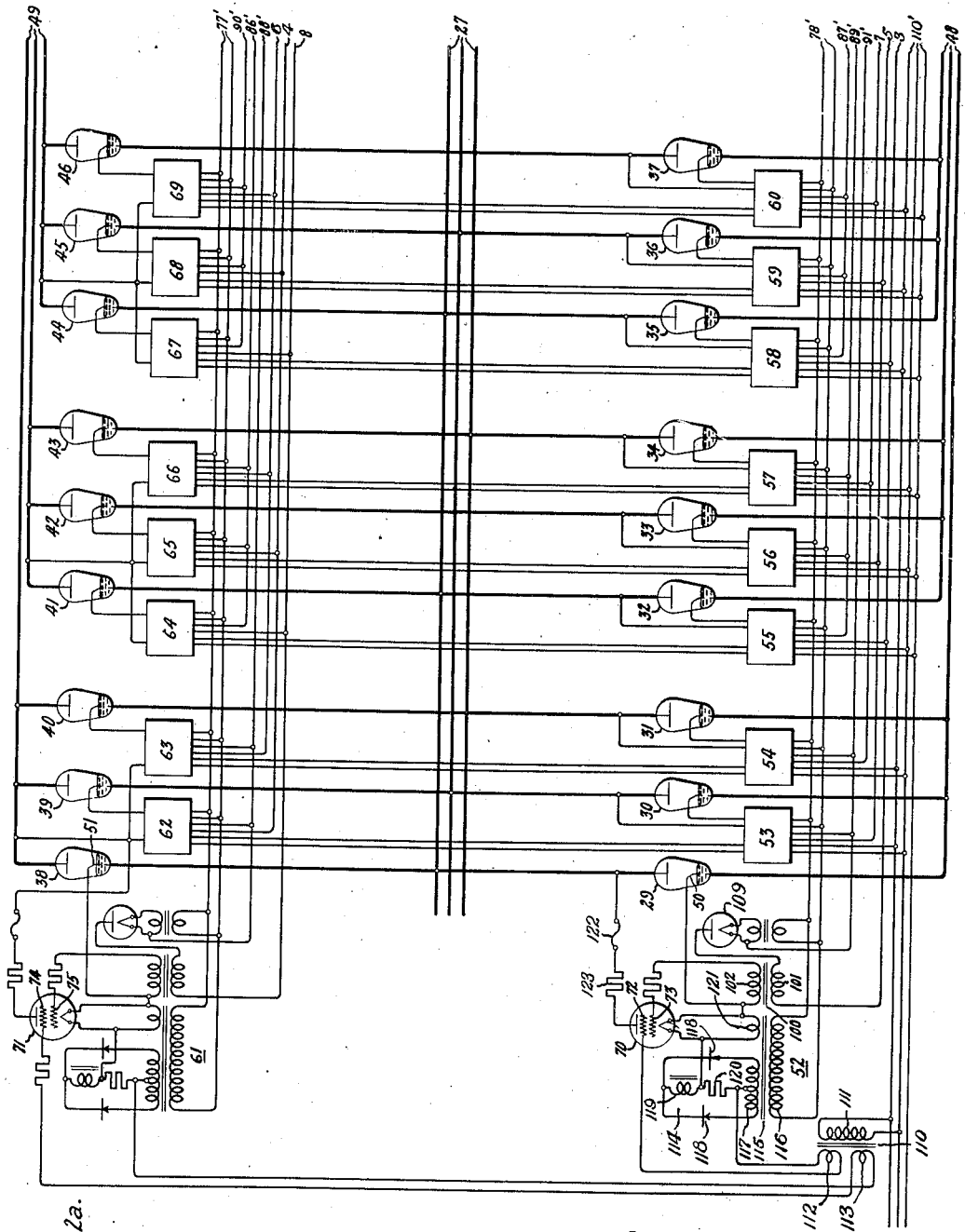

Patented June 15, 1937

2,084,177

UNITED STATES PATENT OFFICE 2,084,177

ELECTRIC POWER SYSTEM

Ernst F. W. Alexanderson and Albert H. Mittag, Schenectady, N. Y., assignors to General Electric Company, a corporation of New York Application February 29, 1936, Serial No. 66,434

38 Claims. (Cl. 172—8)

Our invention relates to electric power systems and more particularly to systems involving the control of motors of the alternating current type through electronic means.

In order to illustrate our invention, we will describe suitable apparatus and methods of operation thereof for carrying it into effect in an electric ship propulsion system. Our invention is especially useful wherein the motor or motors constitute substantially the sole load for an alternating current generator and where the motors are required to reverse under load or effect reversal under certain conditions of operation where the driven member overdrives the motor. It is, of course, understood, however, that the scope of our invention is not limited to the particular application described but is of general application wherever it is desired to control the speed and direction of rotation of a motor or a plurality of motors for operating any vessel, locomotive, vehicle or other apparatus.

It is an object of our invention to provide a new and improved electric power system and method of operation thereof for controlling the speed and direction of rotation of electric motors.

It is another object of our invention to provide a new and improved electric power system comprising an alternating current generator and a motor of the alternating current type wherein the speed of the motor can be varied throughout its operating range with the most efficient mode of operation at all times.

It is another object of our invention to provide a new and improved electric power system for obtaining control of a motor of the synchronous or induction type over the complete speed range of the motor from a source of alternating current of selectively variable ranges of constant frequency.

It is another object of our invention to provide a new and improved electric power system and method of operation thereof wherein motors of the alternating current type are controlled in speed and direction of rotation by electronic means.

In the development of electric ship propulsion systems the essential problem of providing a variable speed ratio between the motor and the generator was arrived at in various ways. The first electrically propelled ship was operated by direct current. The next ship had an alternating current generator and an induction motor with slip rings, so that speed control was produced by a variable secondary resistance. One of the later ships, a battleship, employed a double squirrel cage induction motor and obtained variable speed characteristics with a pole changing winding on the induction motor. On still other ships synchronous motor systems were employed which could operate as induction motors for reversing and starting but the variable speed characteristics of the induction motor was sacrificed along with the advantage of operating the generator turbines at their most efficient speed regardless of the desired speed of the ship.

It is a further object of our invention to provide a new and improved electric power system and method of operation thereof for ship propulsion which combines the complete variability of the speed found in the direct current drives with the economy of synchronous motor design and which gives a flexibility of control much greater than with the induction motor systems.

It is a still further object of our invention to provide a new and improved electric power system for ships wherein all maneuvering and reversing is controlled by control circuits of electronic devices thereby eliminating cumbersome and expensive switching in the high power circuits.

In carrying our invention into effect we employ an alternating current generator of standard design, operated at constant speed for each given range of control by a suitable selectively variable constant speed prime mover and connected through controlled electronic means to energize a pair of motors each having a structural resemblance to the synchronous motor. The electronic means for each motor acts as a rectifier with an output which appears in the form of direct current, and it also serves to guide the direct current successively through different phase windings of its associated motor to produce a torque to rotate the rotor of the associated motor. Control circuits are provided for each electronic means so that by proper energization of the control circuits the motors may be started from rest and accelerated to their maximum speed in a forward direction, or reversed without changing the direction of current flow in the field or armature windings of the motor. Speed control of the motors is effected by the control circuits of the electronic means and by variation in the alternator field. In the arrangement to be described a pair of control circuits for the electronic means are controlled in accordance with the alternator voltage through a phase shifter and a distributor connected to be operated by the motor rotor, and also in accordance with the counter E. M. F. of the motor. In accordance with the illustrated embodiment of our invention, we also provide means whereby the propulsion motors may be operated either in direct synchronous connection with the generators or through the intermediate electronic devices. By this arrangement a further economy of operation is gained for the following reasons:

A ship designed for operation at a maximum speed of 30 knots requires only one-half of this maximum power when operated at 24 knots. Such a ship whether it be a merchant ship or war ship is apt to be operated at the 30 knot speed only exceptionally, whereas the normal operating speed will be 24 knots or less. By use of the dual system of control it is, therefore, possible to design the electronic equipment for a maximum power of only one-half of the maximum power of the ship. Such a ship may advantageously be equipped with two independent power plants including boilers, turbines and generators. For operating the ship at its maximum speed both generators may be connected to energize the motors directly. When the ship is operated at 24 knots one of these power plants may be shut down and the other power plant may be used at its full speed with its maximum power and efficiency for driving the ship at 24 knots. This is made possible by the interposition of the electronic system which changes the speed ratio between the generator and the motor, whereas the same power plant would not be capable of driving the ship at 24 knots with a synchronous connection. Therefore, the ship would have to be operated at further reduced power and reduced efficiency because of the necessity of slowing down the power plant. Further economy may again result from maintaining the power plant at its normal speed because during a long cruise it may be possible to shut down the less efficient auxiliary power plant and derive all the necessary power for operating the ship from the main plant.

We also show and describe means whereby one of the two electronic equipments may be used for serving both propulsion motors. In a propulsion system of the type we describe, this arrangement would be used at lower cruising speeds when one of the electronic equipments is sufficient to operate the ship. This arrangement also saves wear and tear on the other equipment which is not needed and leaves either one free as a spare and makes it possible to make necessary repairs.

The novel features which we believe to be characteristic of our invention are set forth with particularity in the appended claims. The invention itself, however, both as to organization and method of operation, together with further objects and advantages thereof, will best be understood by reference to the accompanying drawings in which Fig. 1 is a diagrammatic view showing the arrangement of apparatus for a pair of motors and electrical connections, partially in simplified one-line diagram, of an embodiment of our invention adapted for a ship propulsion system, and Fig. 2a and Fig. 2b are, respectively, a first and second section of a diagrammatic illustration of one form of one unit of the system shown in Fig. 1.

Figure 2B:
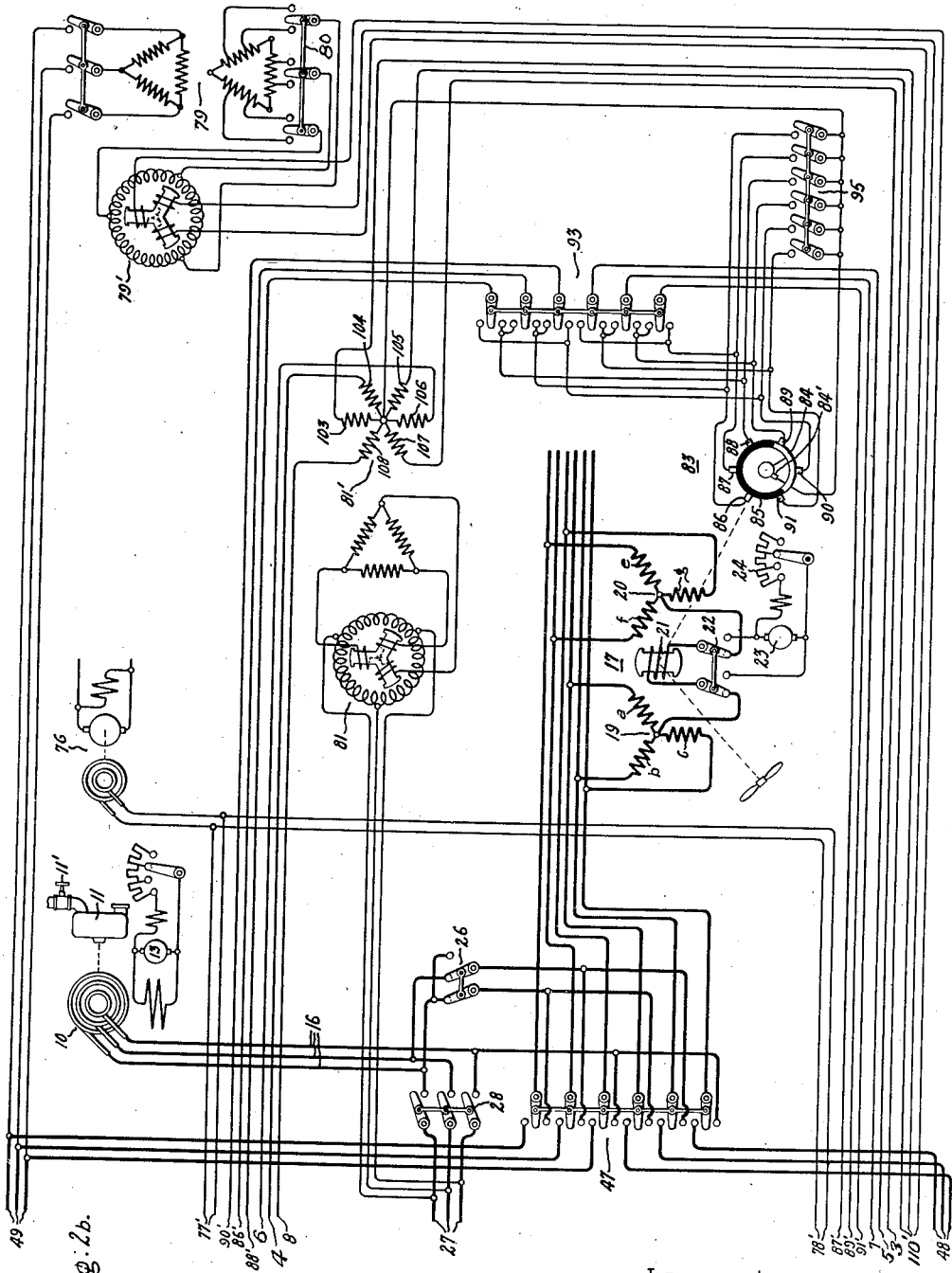

In Fig. 1 of the drawings we have diagrammatically shown a general assembly of the apparatus and electrical connections for carrying out our invention in a two-motor ship propulsion system with a pair of propellor motors. The electrical circuits are shown in one-line diagram where possible in order to simplify the drawings and to aid in making a readily understood disclosure of the apparatus and method of operation of the system. It will, of course, be understood that the operating switches and control apparatus in general of our improved system of propulsion is only diagrammatically illustrated in the accompanying drawings and hence is represented in very elementary forms and described by elementary terms. The system includes a turbo-generator set comprising an alternator 10 and a steam or elastic fluid turbine, or other suitable prime mover 11. A schematic arrangement for varying the speed of the prime mover is shown by the valve 11'. An auxiliary power plant, the purpose of which has been previously described, is represented by the prime mover and alternator 10' which is arranged for connection to the supply bus by a switch 10". The alternator 10 may be any suitable type and is diagrammatically shown as being of the three-phase revolving field type with a field winding 12 energized by an exciter 13 having means illustrated as a rheostat 14 for controlling the excitation of the exciter and thereby the excitation of the alternator 10. Switches 15p and 15s are connected in parallel in circuit with the field winding of exciter 13 and may be interlocked as shown with the speed control mechanism for the respective motors. The alternator 10 is connected through a switch 16' to energize a bus 16. Two motors 17p and 17s are provided for operating the propellers 18p and 18s of the ship. The letters p and s are used by way of illustration for indicating the port and starboard motors, respectively, and similar identifying letters will be used in Fig. 1 for the various main circuits and control circuits corresponding to the motor with which it is normally used. The motors 17p and 17s are illustrated as of the synchronous type. The motor 17p comprises two armature windings 19p and 20p each comprising phase windings connected in three phase Y-connection with a field or exciting winding 21p. In accordance with the broader aspects of our invention the motor may be of the series or shunt type. By way of illustration we have shown the field winding 21p connected for self excitation of the series type through a switch 22p which is arranged to close the circuit between neutrals of the armature windings in one position and in another position is arranged to connect the field winding for excitation from a separate source of excitation 23. The source 23 is illustrated as an exciter having a regulating resistance 24 in its field circuit. A common operating means indicated by the lever 25 may be arranged as shown for simultaneously controlling the resistors 14 and 24. Each of the terminals of the armature windings 19p and 20p is connected to the proper phase conductor of the bus 16 through a phase reversing switch 26p for forward or reverse direction of rotation of the motors when operated directly from the alternator. Each of the terminals of the armature winding 19p and 20p is also interconnected with each of the phase conductors of an alternator bus 27p through switch means 28p and electronic means comprising two groups of oppositely connected main power tubes 29p—37p and 38p—46p. Switching mechanism 47p is provided to disconnect the motor from the tube circuit and connect the motor directly to the alternator when desired. The output side of the group of tubes 29p—37p is connected to the upper side of switch 47p by conductors 48p and the input side of the group of tubes 38p—46p is connected to the upper side of switch 47p by conductors 49p. These tubes may be any of the several types known in the art although we prefer to use tubes of the vapor electric type such as the hot cathode type utilizing mercury vapor, or the immersion ignitor type with a mercury pool cathode. The detailed description of the main power tubes and circuits therefor as well as the control circuits of the several tubes are treated more fully in the description of Figs. 2a and 2b. The power tubes may be controlled directly by suitable excitation circuits for a pair of electrodes within the power tubes as described and claimed in an application of E. F. W. Alexanderson, Serial No. 66,432 or by double control member trigger tubes or dual trigger tubes as described and claimed in an application of E. F. W. Alexanderson, Serial No. 66,433, both filed concurrently herewith and both assigned to the assignee of this application. Further features of the control circuits for the power tubes as described and claimed in an application of J. H. Foley, Serial No. 66,380 filed concurrently herewith and assigned to the assignee of this application may be used without departing from our invention in its broader aspects. By way of illustration we have shown a control circuit for the main power tubes which is described and broadly claimed in an application of A. H. Mittag, Serial No. 66,390, filed concurrently herewith and assigned to the assignee of this application. Each of the main power tubes is illustrated as of the immersion ignitor type and each tube of the group 29p—31p is provided with a control member 50p and each tube of the group 38p—46p is provided with a control member 51p. Each of the control members 50p and 51p is provided with an excitation circuit the energization of which is controlled by a control circuit designated as 52p—60p for the group of tubes 29p—31p and 61p—69p for the group of tubes 38p—46p. Each of the control circuits of each group of main power tubes includes a control or trigger tube 70p and 71p respectively which may likewise be any of the several types well known in the art but we have shown by way of example a mercury vapor type of tube provided with an anode, a heated cathode and a pair of control electrodes or grids. Each of the tubes 70p of the control circuits 52p—60p is provided with control grids 72p and 73p and each of the tubes 71p of the control circuits 61p—69p is provided with control grids 74p and 75p. A suitable source of excitation 76 indicated as a motor generator set with an alternating current generator is provided for energizing the filament or heating means for the cathodes of the trigger tubes through switches 77 and 78 respectively. The grids 72p and 74p are controlled in accordance with an operating condition of the motor such as the counter E. M. F. of the motor through tap changing phase shifting transformer 79p, a rotary phase shifting means 79'p both arranged for shifting the phase of the grid potentials of the control tubes for reserve operation of the motor. In certain cases it will occur to those skilled in the art that the phase shifter 79' may be omitted and the tap phase shifter provided with a plurality of steps of smaller angular shift per step without departing from our invention in its broader aspects. The grids 72p and 74p are connected through a transformer 104 with reversed secondary windings for firing the tubes 70p and 71p 180° apart. The grids 73p and 75p are controlled in accordance with a function of the alternator voltage and are connected through a phase shifting means 81p, and transformer 81'p to the alternator bus 27p through conductors 82p in order to control the several tubes for various speed conditions of the motor. In order to effect control particularly under starting and slow speed conditions there is also included in circuit with the grids 73p and 75p a distributor mechanism 83p for properly selecting the tube to be conductive in order to direct the current through the proper phase winding of the motor. This distributor mechanism 83p may be of any suitable form, for example, of the magnetic type such as is shown in United States Letters Patent No. 1,939,437, granted December 12, 1933 or No. 1,971,188, granted August 21, 1934 or of the mechanical type. In accordance with the broader aspects of our invention, we utilize a control voltage varying in accordance with the speed and mechanical phase position of the rotor. We have shown, by way of illustration, a rotating segment and brush type of distributor mechanism driven from the motor and comprising a rotating segment member having a conducting segment 84p and a non-conducting segment 85p with a plurality of cooperating brushes 86p—91p. A common brush and collector 84'p is connected to the conducting segment 84. The brushes are indicated as being mounted in a brush rigging 92p in order to permit shifting of the brushes and thereby a shift in the excitation of the tubes which we refer to as a shift in motor phase. The phase shifting means 79'p may be arranged to be operated simultaneously with the brush rigging 92p by a common operating means 92'p so that regardless of whether the distributor is short circuited or not, phase shift of the control voltage dependent on the operating condition of the motor may be obtained. Thus if the counter E. M. F. is too low for control, the shift of the brush rigging will effect gradual control after a step change has been taken with the tap changer 79p while if the distributor is short circuited at an intermediate speed, phase control of the motor control voltage is effected after the step change by the phase shifter 79'p. For one direction of rotation of the associated motor the order of energization of the respective brushes must be in a given sequence and for a reverse torque the order of energization of the brushes is in the same sequence but shifted in phase relative to the mechanical phase position of the rotor. When the distributor reverses then the sequence is reversed by the distributor. A switch 93p for shifting the time of energization of the respective brushes is arranged for simultaneous operation with the phase adjusting transformer 79p by means of a suitable operating means illustrated as a manually operated handle 94p designated "reverse". In circuit with the switch 93p is switching means 95p for short circuiting or removing the distributor mechanism 83p from the grid control circuit, if desired, when the motor attains a predetermined speed. It is to be understood, however, that the motor may be operated throughout its full speed range under distributor control. The switching means 95p is illustrated as being operated to its short circuiting position after a certain phase shift has been attained with the phase shifter 81p by means of a common operating means illustrated as a manually operated handle 96p designated "speed".

The other unit of our system is illustrated with apparatus designated by way of illustration as the starboard unit and is arranged in the same manner as the port unit so that corresponding elements have been designated with like numerals but characterized by the subscript s.

In accordance with our invention we provide means for obtaining dual operation of the motor by either the port or starboard electronic means and have shown switching means 97 for effecting a proper connection of the respective phase terminals of the two motors for this operation. As shown corresponding windings of the respective motors are connected in parallel on the output side of one group of tubes and the remaining corresponding windings are connected in parallel on the input side of the return tubes. By closing switch 97 and opening the terminal connections of either motor by switches 98p and 98s the remaining motor may be operated from the tube control means of the other motor. In other words the port and starboard motors may be operated simultaneously by either the port or starboard electronic means and either the port or starboard motor may be operated by either the port or starboard electronic means by proper positioning of the switches and by disconnecting one motor from the circuit. The motors may also be connected for parallel operation directly from the alternator bus 16 through the phase reversing switches 26p and 26s and the switches 47p and 47s so that operation may be obtained in the reverse direction as well as the forward direction when energized directly from the alternator.

The operation of the arrangement shown in Fig. 1 will be explained first in order to point out with more clarity the various features of operation and the functions of the various control elements and their relation in the complete system. For purposes of explaining our invention we will assume the ship propulsion system is of the kind having motors 17p and 17s respectively coupled to port and starboard propellers and where the motors are arranged to be energized from the same generator. With all of the switches in the open position as shown it will be necessary to close switches 28, 47 to its upper position for tube operation, 77 and 78 for the heater circuit of the control tubes and 93 for the distributor brushes. With the double grid trigger tube control system as shown the operation for forward speed may be effected by the operating lever 96 marked "Speed" for both port and starboard motors. The "speed" lever 96 has an operating position where the alternator field 12 is open circuited and the whole system is deenergized. The first control position of lever 96 gives minimum alternator excitation and a phase retardation on the grids 73 and 75 through phase shifter 81 which gives current so low that it is insufficient to start the motor. Advancing the lever 96 advances the phase of the potential of grids 73 and 75 until the full power which is possible with minimum alternator field is delivered to the motor. Further advance of the lever 96 may be arranged to increase the excitation of the alternator field by decreasing the resistance 14 of exciter 13. As the lever 96 is advanced the distributor mechanism is short circuited by the switch 95 so that control is shifted to control in accordance with the counter E. M. F. of the motor and the phase control of the alternator voltage through phase shifter 81. When this point in the control is obtained the excitation of the alternator field 12 may be increased to further accelerate the motor by increasing the voltage of the alternator. It will thus be observed that there is provided three ranges of speed control for a given direction of rotation of the motor. First, the motor is started and accelerated to a relatively low intermediate speed under control of the electronic means in accordance with phase shift of the alternator voltage and the mechanical phase position of the rotor of the motor, second, the speed is increased from the relatively low intermediate speed to a higher intermediate speed under control of the electronic means in accordance with the phase shift of the alternator voltage and counter E. M. F. of the motor, and third, in accordance with the voltage of the alternator.

Now let it be assumed that it is desired to reverse the propeller while the ship is going forward. Since the water drives the propeller as a turbine it is necessary for the motor to exert considerable torque in order to stop the propeller and also to maintain a high torque during the whole process of reversal. In accordance with our system the reversal is effected by control of the electronic means without switching in the main power circuits. The direction of current flow in the field and armature windings of the illustrated arrangement is not changed for either direction of rotation of the motor. The "reverse" control lever 94 in its first movement for reverse operation shifts the phase of the voltage applied to the grids 72 and 74 through switch 80 so that the time of firing of the several valves of the groups 29—37 and 38—46 is changed to cause the successive energization of the several phase windings of the motor to occur at a time relative to the mechanical position of the rotor so that the torque of the motor is reversed. At this point in the reversing cycle while the rotor is being overdriven, the motor begins to act as a series generator with a low negative resistance characteristic. By the term "negative resistance characteristic" or "equivalent negative resistance" we define any circuit element in which a positive increment of current is accompanied by a negative increment of voltage. If we were to have a complete analogy with direct current machinery we would have to imagine a series generator which could be controlled by brush shifting and the circuit completed by another direct current machine corresponding to the alternator which could be controlled by brush shifting. A direct current series generator is usually thought of as an unstable and uncontrollable machine. This is because it acts like a negative resistance. It is, however, known that a series generator becomes a controllable and useful machine if the circuit includes enough positive resistance to offset the negative resistance characteristic of the generator. Shifting the grid phase of the motor by means of the brush shifter 92 controls the amount of equivalent negative resistance of the electronic motor and shifting the phase of the control potential dependent upon the generator voltage by means of phase shifter 81 controls the resistance of the output circuit. The electronic motor of our system thus possesses characteristics of controllability especially adapted for ship propulsion. The equivalent negative resistance of our motor at the first reverse position just beyond neutral may be so low that the motor does not self-excite as a series generator, therefore the current must be forced through it by the alternator. This current flow is controlled by the alternator field 12 and the alternator voltage grid control phase shifter 81. When the brush yoke 92 is moved further in the direction for the reverse operation the grid excitation of the motor voltage is shifted further until the motor begins to self-excite as a series generator and increases its torque to the desired degree. This in turn will cause the propeller speed to break down which requires still further shift of the motor phase by the brush yoke 92 to maintain series generator operation until the propeller has been brought to standstill and the phase of the control grids of the electronic means adjusted for motor operation in the reverse direction. For further increasing the torque the power must come from the turbo alternator. The excitation of field winding 12 must be increased and the phase shifter 81 advanced until the full reversing speed has been reached. Since the brush yoke 92 and the rotary phase shifter 79' may be interlinked as previously suggested and as shown in the drawings any reference to movement of the brush yoke 92 in the method of operation just described, also applies to the rotary phase shifter 79' when the speed of the motor is sufficient to have sufficient counter E. M. F. for control.

In Figs. 2a and 2b we have shown a diagrammatic illustration of a three phase arrangement of one unit of our system shown in Fig. 1. Elements and circuits corresponding to the same elements or circuits in Fig. 1 have been given like reference numerals for ease of identification. The three phase alternator 10 which is driven by the prime mover 11 is connected to energize the bus 16. The arrangement is such that the motor 17 may be energized through the electronic means or directly from the alternator. Thus, the bus 16 is connected through the switch 28 to energize the three phase bus 27 for connecting the electronic means to the alternator and through the phase reversal switch 26 to one side of the selective switch 47. The selective switch 47 in its upper position as viewed in the drawings connects the motor windings to the electronic means and in its lower position connects the motor windings in parallel for energization directly from the alternator. The motor windings 19 are further identified in Fig. 2b by assigning letters a, b and c to the respective winding sections or phase windings. Similarly, the corresponding phase windings of motor windings 20 are indicated by the letters e, f and g. The respective phase terminals of the motor winding 19 are connected through the switch 47 in its upper portion through conductors 48 to the output or cathode terminals of electronic means illustrated as a plurality of single-arc-path electronic valves 29—37 inclusive. These valves in groups of three are connected with their input or anode terminals to the respective phase conductors of the bus 27. The respective phase terminals of the motor winding 20 are connected through the switch 47 and conductors 49 to the input or anode terminals of electronic valves 38—46 inclusive. These valves in groups of three are oppositely disposed relative to the first mentioned groups of valves with respect to the phase conductors of bus 27 since the cathode terminals are connected to the bus 27. The electronic means are preferably of the gaseous or vapor type and may be of the multiple anode-single cathode type such as the tank type rectifier or the single anode-single-cathode type with a heated cathode or a pool type cathode. We have illustrated by way of example single arc path electronic valves of the immersion ignitor type and each valve of the groups 29—37 and 38—46 is provided with an anode, a pool type cathode and a control member or electrode 50 and 51 respectively. The three groups of valves 29—31, 32—34, and 35—37 operate as controlled rectifiers to supply unidirectional current to the motor windings 19. The three groups of oppositely disposed valves 38—40, 41—43, and 44—46 operate as controlled rectifiers to return the unidirectional current to the bus 27 through the field winding 21 and motor windings 20. The sequence of energization of the phase windings of the motor is controlled by controlling the energization of the various groups of valves associated with the respective phase windings.

In accordance with this particular embodiment of our invention we provide individual control circuits 52—69 for the valves 29—46 respectively. The control circuit 52 for valve 29 and the control circuit 61 for valve 38 are shown in detail, and identical control circuits for the remaining valves are represented schematically by a rectangular outline with connections indicated in the proper manner and sequence corresponding to the valve to be controlled. It is believed that this part of our invention will be readily understood by an explanation in detail of control circuit 52.

The control circuit 52 for valve 29 comprises an electronic device 70 preferably of the gaseous or vapor type valve having an anode, a cathode and the control members 72 and 73. Means responsive to a condition of the supply circuit and the motor circuit is provided for conjointly controlling the conductivity of valve 70. The control member 73 is energized in acordance with a condition of the supply circuit through a transformer 100 having a primary winding 101 and a secondary winding 102. The transformer 100 is energized from the valve supply bus 27 through the rotary phase shifting means 81 and a transformer 81'. The secondary winding of transformer 81' comprises a double three phase arrangement of windings 103—108. One terminal of each primary winding 101 of the transformers 100 for the control circuits for valves 29 to 37 is connected to the terminals of windings 103, 105, and 107 through conductors 3, 5, and 7 respectively, and each of the corresponding transformer terminals for the control units of the oppositely disposed group of valves 38 to 46 is energized from terminals of windings 104, 106 and 108 through conductors 4, 6, and 8. In order to control the conductivity of the main valves particularly for starting the motor and at low speeds means comprising the distributor mechanism 83 is connected to the rotor of the motor 17. The distributor 83 is provided with a brush 84' which is connected to the neutral connection of the secondary winding of transformer 81'. The distributor comprises a non-conducting segment 85, shown in black, and a conducting segment 84 of 120 electrical degrees and brushes 86—91 which are displaced by sixty electrical degrees relative to each other. The brushes 87, 89, and 91 are connected in a circuit with the transformer 100 through conductors 87', 89', and 91' respectively, for the valves 29 to 37 and through the phase shifting switch 93 for initiating the reversing cycle of operation for the motor. Similarly the brushes 86, 88, and 90 are connected in a circuit with the transformer 100 through conductors 86', 88', and 90' respectively, for the valves 38 to 46 and through the phase shifting switch 93. The switch 95 is connected to the conductors from the several brushes in order that the distributor may be removed from the circuit or as shown short circuited when it is desired to effect control of the motor in accordance with the counter E. M. F. of the motor. To prevent interchange of energy between the several grid circuits of the grids 73 for the group of valves associated therewith when a distributor is used having a plurality of grid circuits connected to the same circuits, a rectifier 109 is connected in series relation with the primary winding of transformer 100.

A voltage which varies in accordance with a condition of the motor is impressed on the control member 72 through transformer 110 having a primary winding 111 and two secondary windings 112 and 113. A bi-phase rectifying unit 114 comprising a transformer 115 having a primary winding 116 and a secondary winding 117, unidirectional conducting devices 118, a smoothing inductance 119, and a resistance 120, is provided to furnish a negative bias in the circuit of control electrode 72. A secondary winding 121 on transformer 115 furnishes heating current for the valve 70. The left hand terminal of transformer winding 102 is connected to the cathode of valve 70 and to the control electrode 50 of valve 29. The anode of valve 70 is connected through current limiting means such as the fuse 122 and resistor 123 to the anode of valve 29. The valve 70 is thus energized in accordance with the voltage appearing across the anode and cathode of the main valve 29. The transformer 110 is connected to be energized in accordance with the voltage of the motor 17 and is connected through the phase adjusting transformer 79 which is provided on the secondary winding side with a switch 80 for effecting a proper shift in the phase of the voltages energizing the transformer 110 when the motor is increased under counter E. M. F. control. The heater circuits of the control valves for the excitation circuits 52—60 is obtained from the separate source of excitation 76 through conductors 78'. Similarly the heater circuits for the excitation circuits 61—69 is obtained from the source 76 through conductors 77'.

The operation of the illustrated embodiment of one unit of our system as shown in Figs. 2a and 2b is substantially as follows: The general principles of operation of the motor through the valves has been pointed out previously in connection with the description of Fig. 1. It will be assumed that the prime mover is operating the alternator with minimum field excitation, that switch 28 is closed, that switch 47 is closed to its upper or "valve" position, that switch 93 is closed to its lower or "forward" position, that switch 95 is in its open position for distributor operation, that switch 22 is in its left-hand position to connect the neutrals of the motor windings through the field winding 21, and that the rotor is in approximately the position illustrated. It will also be assumed that the rotary phase shifting transformer 81 is adjusted so that the phase of the alternating potential impressed on the control electrodes 73 and 75 of the valves 70 and 71 will be retarded with respect to the anode potentials in order to reduce the average voltage impressed on the windings 19 and 20 of motor 17. Under the assumed conditions the brushes 89 and 90 of the distributor 83 are connected through the conductive segment 84, so that the excitation control transformer 100 of the group of valves 32—34, and 44 to 46 are energized respectively. These two groups of valves now act as controlled rectifiers supplying unidirectional current to 19b from the valves 32—34, through field winding 21, and then through 20g and back to the supply bus through valves 44—46. It will be assumed that with these portions of the armature winding energized their magnetomotive force will produce a torque upon the rotor 21 to accelerate it in a clockwise direction. When the rotor has turned through substantially 60 electrical degrees the conductive segment of the distributor interrupts the circuit from brush 89, maintains the circuit for brush 90 and establishes a circuit for brush 91. The closing of the circuit of brush 91 establishes the excitation circuit of the groups of valves 29 to 31. With this excitation circuit energized current is transferred from 19b to 19a advancing the phase of the magnetomotive force of the motor by 60 electrical degrees so that the rotor is again in approximately maximum torque producing position with respect to the motor magnetomotive force. In this manner the current is successively transferred between the several terminals of the armature windings 19 and 20 to produce a rotation of the rotating member 21. With the arrangement described it will be noted that under any conditions current is supplied only to the windings which are in torque producing position with respect to the rotor and the rotor will accelerate dependent upon the connected load on the motor. The motor system therefore has the characteristics of a direct current series motor system. The speed torque characteristic of the motor is varied by adjusting the rotary phase shifting transformer 81.

The operation just described is one method of controlling the motor at starting and for relatively low speeds. In this case the rectified current is directed through the respective phase windings of the motor in accordance with the mechanical phase position of the rotor. Satisfactory operation of the motor above approximately half speed may be obtained by effecting control of the trigger valves and therefore of the main valves in accordance with the counter E. M. F. of the armature windings. The trigger valves 70 and 71 are constructed and arranged so that either of the control members may maintain the valve non-conductive by impressing a voltage sufficiently negative in polarity on the control members. The valves, however, may be rendered conductive if suitable voltages are impressed concurrently on both control members. In the low speed range the counter E. M. F. may be insufficient to render the valves non-conductive but the generator voltage through the distributor is sufficient to effect the desired control. When the motor is up to say half-speed the distributor is disconnected from the circuit by closing the switch 95, and the grids 72 are then sufficiently energized by the counter E. M. F. of the motor to co-operate with the generator voltage on the grids 73 to obtain proper firing of the main valves so as to energize the motor windings in the proper sequence for further acceleration to full speed forward.

For obtaining reverse rotation of the motor, the phase shifting switch 93 is moved to its upper position and the phase shifting switch 80 is moved to its lower position. With this change in the switching the motor is reversed in accordance with the general principles of operation set forth in the description of Fig. 1. If in the forward direction of rotation of the motor we assume the stator M. M. F. is in advance of the rotor M. M. F. then when the phase shift switch 93 is moved in its position for effecting reversal, the time phase of energization of the several brushes is shifted back 120 degrees relative to the mechanical phase position of the rotor and the phase of the motor voltage is shifted back by switch 80. So long as the rotor and hence the distributor continues to rotate in the forward direction, the phase rotation in the motor windings remains the same as for the forward direction of rotation although the torque is reversed which constitutes a braking action. When the motor stops and then starts rotating in the reverse direction the phase rotation of the motor windings is reversed by reason of the reverse rotation of the distributor which selects the particular valves for energization and controls the sequence of energization of the motor windings for operating the motor in the reverse direction. In view of the previous description of the general features of the operation of the motor in the reverse direction coupled with the detailed description of the operation of the motor in the forward direction, it is believed it will not be necessary for a clear understanding of our invention to describe further details of the operation of the motor for the reverse rotation.

While we have shown and described a particular embodiment of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. In an electric power system, a generator, a motor having armature and field windings, and electronic means including a plurality of discharge paths and constructed and arranged for causing operation of said motor from one direction of rotation to another with the same relative direction of current flow in said armature and field windings, said electronic means including means arranged to change the time of energization of the respective discharge paths without changing the sequence of energization of said discharge paths prior to reversal of direction of rotation of said motor.

2. In an electric power system, a generator, a motor having armature and field windings, a member coupled to be driven by said motor under certain conditions of operation and overdriving said motor under certain other conditions of operation, and electronic means constructed and arranged for causing operation of said motor in either direction of rotation with the same direction of current flow in said armature and field windings.

3. In an electric power system, an alternating current generator, a motor of the alternating current type having a stator winding comprising a plurality of winding sections and a rotor winding connected to be energized in series relation with said winding sections, and electronic means including a plurality of discharge paths and constructed and arranged for causing operation of said motor from one direction of rotation to another with the same relative direction of current flow in said stator and rotor windings, said electronic means including means arranged to change the time of energization of the respective discharge paths without changing the sequence of energization of said discharge paths prior to reversal of direction of rotation of said motor.

4. In an electric power system, an alternating current generator, a motor of the alternating current type having a stator winding comprising a plurality of winding sections and a rotor winding connected to be energized in series relation with said winding sections, a member coupled to be driven by said motor under certain conditions of operation and overdriving said motor under certain other conditions of operation, and electronic means constructed and arranged for causing operation of said motor in either direction of rotation with the same relative direction of current flow in said stator and rotor windings.

5. In an electric ship propulsion system comprising in combination a prime mover, a synchronous generator coupled to said prime mover, a propeller, a motor of the synchronous type having stator and rotor windings and coupled to said propeller, and electronic means including a plurality of discharge paths and constructed and arranged for causing operation of said motor from one direction of rotation to another with the same direction of current flow in said stator and rotor windings, said electronic means including means arranged to change the time of energization of the respective discharge paths without changing the sequence of energization of said discharge paths prior to reversal of direction of rotation of said motor.

6. In an electric power system, an alternating current generator, a motor of the alternating current type including a rotating field member, means connected between said generator and said motor comprising electronic means having a plurality of discharge paths, means for controlling the conductivity of said discharge paths, means for controlling the sequence of energization of the conductivity controlling means, and means for effecting reversal of the torque of said motor comprising means for shifting with the same sequence the time of energization of the conductivity controlling means relative to the angular position of said field member while said field member is rotating in a direction opposite to the direction of torque of said motor.

7. In an electric power system, an alternating current generator, a motor of the alternating current type including a rotating field member, means connected between said generator and said motor comprising electronic means having a plurality of discharge paths, means for controlling the initiation of the discharge in the several discharge paths, means connected to said field member for determining the sequence of energization of the discharge initiation means, and means for effecting a reversal of the torque of said motor and consequent reversal in direction of rotation thereof comprising means for shifting with the same sequence the time of energization of the discharge initiation means relative to the angular position of said field member.

8. An electric valve converting system comprising a source of current, a polyphase motor provided with a plurality of phase terminals and with a rotating field member, a plurality of electric valves interconnecting said source and said terminals for commutating the current therebetween, each of said valves being provided with a control member, a source of potential for energizing said control members, a distributor driven by said motor to excite said control members in a predetermined sequence, and means for selectively determining the time of energization of said control members relative to the angular position of said field member for controlling the direction of torque of said motor.

9. An electric power system comprising a source of current, a polyphase motor provided with a plurality of phase terminals and with a rotating field member, a plurality of electric valves interconnecting said source and said terminals, each of said valves being provided with a control member, a source of potential for energizing said control members, a distributor coupled to said motor and interconnecting said source of potential and said control members to excite said control members in a predetermined sequence, and switching means for changing the connections of said control members to said distributor relative to the mechanical position of said field member while maintaining the same sequence of energization of said control members to effect reversal of the direction of torque of said motor.

10. In an electric ship propulsion system comprising in combination a prime mover, an alternating current generator coupled to said prime mover, a propeller, a motor coupled to said propeller, means connected between said generator and said motor comprising electronic means having a plurality of discharge paths, and means arranged to control conjointly the sequence and time of conductivity of the respective discharge paths for controlling the direction of rotation of said motor.

11. In an electric ship propulsion system comprising in combination a prime mover, an alternating current generator coupled to said prime mover, a propeller, a motor coupled to said propeller and having a rotating field member, means connected between said generator and said motor comprising electronic means having a plurality of discharge paths, means operative in accordance with an operating condition of said motor for controlling the sequence of conductivity of the respective discharge paths, and means for selectively determining the time of energization of said discharge paths relative to the angular position of said rotating field member for reversing the direction of torque of said motor while the direction of rotation of said motor is opposite to said torque.

12. In an electric ship propulsion system comprising in combination an elastic fluid turbine, an alternating current generator coupled to said turbine, a propeller, a motor of the alternating current type coupled to said propeller, means connected between said generator and said motor and comprising electronic means having a plurality of discharge paths, said electronic means having a control member for each discharge path for selectively initiating current flow in the respective discharge paths, and means arranged to control conjointly the sequence and the time of energization of said control members for controlling the direction of rotation of said motor.

13. In an electric power system, an alternating current generator, a motor of the alternating current type having a stator winding comprising a plurality of winding sections and a rotor winding connected to be energized in series relation with said winding sections, a member coupled to be driven by said motor under certain conditions of operation and overdriving said motor under certain other conditions of operation, electronic means having a plurality of discharge paths, a discharge path being included in series relation with each of said winding sections, means for selectively initiating current flow in the respective discharge paths in a predetermined sequence for a predetermined direction of rotation of said motor, and means arranged to shift the time of initiation of current flow in said predetermined sequence in the respective discharge paths relative to the angular position of said rotor winding in a direction to reverse the direction of torque of said motor.

14. In an electric power system, an alternating current generator, a motor of the polyphase alternating current type, electronic means for controlling the energization of said motor, means arranged to control said electronic means for controlling the phase rotation of said motor, and means for selectively determining the direction of the torque of said motor for any given phase rotation thereof.

15. The method of reversing a ship while in motion with a ship propulsion system including an alternating current generator, a propeller, a motor of the alternating current type comprising armature and field windings, and electronic means interposed between said generator and said motor which comprises controlling said electronic means to shift the armature flux relative to the field flux of said motor in a direction to reverse the torque of the motor, further controlling said electronic means so that said motor operates as a generator, still further controlling said electronic means until said motor cames to rest, and then reversing the phase rotation of said motor and controlling said electronic means for operating said motor in the reverse direction.

16. The method of reversing a ship while in motion with a ship propulsion system including a prime mover, a variable voltage alternating current generator driven thereby, a propeller, a motor of the synchronous type comprising a stator with a plurality of winding sections thereon and a rotor with a winding in series relation with said sections, and controlled electronic means interposed in series relation between said generator and motor, which comprises shifting the stator flux relative to the rotor flux by said electronic means in a direction to reverse the torque of said motor, then controlling the current flow through said motor by varying the voltage of the generator and varying the time of initiation of the discharge in said electronic means until said motor begins to self-excite as a series generator, then still varying the time of initiation of the discharge in said electronic means until said propeller is brought to rest and the time of initiation of the discharge is such that said motor is energized for motor operation in the reverse direction, and then further changing the time of initiation of the discharge of the electronic means and the voltage of the alternator until full reversing speed has been attained.

17. The method of reversing an overdriven electric motor in an electric power system comprising a variable voltage alternating current generator connected to energize through controlled electronic means an electric motor of the synchronous type having a field winding in series relation with the armature winding which comprises shifting the phase of the armature M. M. F. relative to the field M. M. F. by the electronic means in a direction to reverse the torque of the motor, then controlling the current flow through said motor by varying the voltage of the generator and varying the time of initiation of the discharge in said electronic means until said motor begins to self-excite as a series generator, then still varying the time of initiation of the discharge in said electronic means until said motor is brought to rest and the time of initiation of the discharge is such as to obtain motor operation in the reverse direction, and then further changing the time of initiation of the discharge of the electric means and the voltage of the alternator until full reversing speed has been attained.

18. In an electric ship propulsion system, a prime mover, an alternating current generator coupled to said prime mover, an electric motor having a rotor, a propeller coupled to said motor, electronic means comprising a plurality of discharge paths for transmitting current between said generator and said motor, means for changing the time of initiation of current flow in said discharge paths, distributor means coupled to said motor for controlling the sequence of initiation of current flow in the several discharge paths of said electronic means when said motor operates in either direction, and interlocking means for conjointly controlling the means for changing the time of initiation of current flow and said distributor means for effecting a reversal in direction of rotation of said motor.

19. In an electric power system, an alternating current generator, a plurality of motors connected to be energized from said generator, individual electronic means for controlling each motor, and means arranged for selectively controlling any one motor from any one electronic means.

20. In an electric power system, an alternating current generator, a plurality of motors connected to be energized from said generator, individual electronic means for controlling each motor, and means arranged for selectively controlling all of said motors from any one of said electronic means.

21. The combination in a system of ship propulsion, of a propeller on each side of the ship, a motor coupled to each propeller, electronic means for controlling each motor, and means arranged for selectively controlling either motor from either electronic means.

22. The combination in a system of ship propulsion of a propeller on each side of the ship, a motor coupled to each propeller, electronic means for controlling each motor, and means arranged for selectively controlling the simultaneous operation of both motors from either one of said electronic means.

23. In an electric power system, an alternating current generator, an electric motor, electronic means arranged for connection in series relation with said motor, and means for selectively energizing said motor through said electronic means or directly from said generator.

24. In an electric ship propulsion system, a pair of power plants each comprising a prime mover and an alternating current generator driven thereby, a propeller, a motor coupled to said propeller, electronic means for at times controlling the energization of said motor, means for connecting said motor directly to said generators for operation of said ship between an intermediate speed and its maximum speed, means for connecting said motor to one of said generators through said electronic means for operation of said ship at substantially said intermediate speed, and means for connecting said motor directly to one of said generators for operation of said ship at speeds below said intermediate speed.

25. The method of controlling a ship with a ship propulsion system comprising duplicate power plants each of which includes a prime mover and an alternating current generator driven thereby, a propeller, a motor, and electronic means for at times controlling the energization of said motor which comprises energizing said motor directly from both of the generators for operation of said ship for speeds above a predetermined intermediate speed, energizing said motor through said electronic means for operation of said ship at substantially said intermediate speed, and energizing said motor directly from one of said generators for speeds of said ship below said intermediate speed.

26. In an electric power system, an alternating current generator, means for varying the voltage of said generator, an electric motor, electronic means interposed between said generator and said motor, and means for varying the operation of said motor by varying the conductivity of said electronic means and the voltage of said generator.

27. In an electric ship propulsion system, a prime mover, an alternating current generator coupled to said prime mover, an electric motor, a propeller coupled to said motor, electronic means interposed between said generator and said motor, and means for varying the speed of the ship by varying both the conductivity of said electronic means and the voltage of said generator.

28. In an electric ship propulsion system, a selectively variable constant speed prime mover, an alternating current generator coupled to said prime mover, an electric motor, a propeller coupled to said motor, electronic means interposed between said generator and said motor, and means for varying the speed of the ship by varying the conductivity of said electronic means and the voltage of said generator for each selected speed of said prime mover.

29. In an electric ship propulsion system, a prime mover, an alternating current generator coupled to said prime mover, an electric motor, a propeller coupled to said motor, electronic means for transmitting current between said generator and said motor, means for varying the conductivity of said electronic means, means for varying the voltage of said generator, and interlocking means for simultaneously operating the conductivity control means and the voltage varying means.

30. In a ship propulsion system, a prime mover, an alternating current generator coupled to said prime mover, a motor of the synchronous type having a stator and a rotor member, a propeller coupled to said motor, electronic means interposed between said generator and said motor, means for varying the conductivity of said electronic means, and means for controlling the speed of the ship by said first-mentioned means in accordance with the mechanical phase position of said rotor.

31. In a ship propulsion system, a prime mover, an alternating current generator coupled to said prime mover, a motor, a propeller coupled to said motor, electronic means interposed between said generator and said motor, means for varying the conductivity of said electronic means, and means for controlling the speed of the ship by said first-mentioned means in accordance with the counter-electromotive force of the motor.

32. In a ship propulsion system, a prime mover, an alternating current generator coupled to said prime mover, a motor, a propeller coupled to said motor, electronic means interposed between said generator and said motor, and means for controlling the speed of the ship through said electronic means by varying the voltage of said generator.

33. In a ship propulsion system, a prime mover, an alternating current generator coupled to said prime mover, a motor of the synchronous type having a stator and a rotor member, a propeller coupled to said motor, electronic means interposed between said generator and said motor, conductivity varying means for said electronic means, means for controlling the speed of the ship from standstill to a relative low intermediate speed by said conductivity varying means in accordance with the mechanical phase position of said rotor, means for controlling the speed of the ship from relative low intermediate speed to a higher intermediate speed by said conductivity varying means in accordance with the counter-electromotive force of said motor, and means for controlling the speed of the ship from said higher intermediate speed to its maximum speed through said electronic means by varying the voltage of said generator.

34. The method of controlling the speed of a ship with a ship propulsion system including a prime mover, a variable voltage alternating current generator driven thereby, a propeller, a motor of the synchronous type comprising a stator with a plurality of winding sections thereon and a rotor, and electronic means interposed between said generator and said motor which comprises varying the conductivity of said electronic means from a low value of average current to an intermediate value of average current and successively establishing energization of the several phase windings of said motor from said electronic means in accordance with the angular position of the rotor, then further increasing the conductivity of said electronic means and successively establishing energization of the several phase windings of said motor from said electronic means in accordance with the counter E. M. F. of said motor, and then when said electronic means is fully conductive increasing the voltage of said generator for increasing the speed of said ship.

35. In an electric power system, a source of alternating current, an electric motor having a rotor member, electric translating apparatus interconnecting said generator and said motor comprising electronic means having input and output electrodes, control means for said electric means connected to be energized in accordance with the voltage appearing across said electrodes and comprising an electronic device having two control members, means for energizing one of said control members with a voltage varying in accordance with an operating condition of said motor, and means for energizing the other of said control members in accordance with an electrical condition of said source of alternating current.

36. In an electric power system, a source of alternating current, a dynamo-electric machine having a stator and a rotor member, electric translating apparatus interconnecting said source and said machine comprising an electric valve of the gaseous type having an anode, a cathode and an immersion-ignitor control member, and an excitation circuit energized in accordance with the voltage appearing across said anode and said cathode of said electric valve comprising an electronic device of the gaseous type having two control members, a distributor mechanism for said dynamo-electric machine, means for energizing one of said control members through said distributor mechanism in accordance with the angular position of the M. M. F. of said rotor relative to the M. M. F. of said stator, and means for energizing the other of said control members in accordance with an electrical condition of said dynamo-electric machine.

37. In combination, an alternating current supply circuit, a dynamo-electric machine of the synchronous type having a plurality of phase windings and a field winding connected to be energized in series relation with said phase windings, a plurality of electric valves for transmitting current from said supply circuit to said phase windings, a plurality of electric valves disposed in a sense opposite to that of said first-mentioned valves for returning said current through said field winding and said phase windings, and a plurality of excitation circuits for effecting selective energization of said phase windings and each being associated with a different one of said electric valves and being energized in accordance with the voltage appearing across an anode and cathode of said associated electric valve comprising an electronic discharge device, distributor mechanism coupled to said dynamo-electric machine, means for controlling the energization of said electronic discharge device through said distributor mechanism from said supply circuit, and means for controlling the energization of said device in accordance with a function of the voltage of said machine.

38. In combination, an alternating current supply circuit, a motor of the synchronous type having a plurality of phase windings and a field winding connected to be energized in series relation with said phase windings, a plurality of electric valves for transmitting current from said supply circuit to said phase windings, a plurality of electric valves disposed in a sense opposite to that of said first-mentioned valves for returning said current through said field winding and said phase windings, and a plurality of excitation circuits each associated with a different one of said electric valves and being energized in accordance with the voltage appearing across an anode and cathode of said associated electric valve comprising an electronic discharge device having two control members for conjointly controlling the conductivity of said device, means comprising a distributor mechanism coupled to said motor for energizing one of said control members from said supply circuit, and means for energizing the other of said control members in accordance with the C. E. M. F. of said motor.

ERNST F. W. ALEXANDERSON.
ALBERT H. MITTAG.